United States Patent
Hwang

(10) Patent No.: US 10,033,416 B2
(45) Date of Patent: Jul. 24, 2018

(54) FILTER MODULE AND ELECTRONIC DEVICE USING THE SAME

(71) Applicant: WISOL CO., LTD., Osan-si, Gyeonggi-do (KR)

(72) Inventor: Kyu Han Hwang, Osan-si (KR)

(73) Assignee: WISOL CO., LTD., Osan-si, Gyeonggi-Do (KR)

( * ) Notice: Subject to any disclaimer, the term of this patent is extended or adjusted under 35 U.S.C. 154(b) by 28 days.

(21) Appl. No.: 15/258,031

(22) Filed: Sep. 7, 2016

(65) Prior Publication Data

US 2017/0070248 A1    Mar. 9, 2017

(30) Foreign Application Priority Data

Sep. 7, 2015  (KR) .................. 10-2015-0126487

(51) Int. Cl.
*H04B 1/10* (2006.01)
*H04B 1/04* (2006.01)
*H04B 1/40* (2015.01)

(52) U.S. Cl.
CPC .................. *H04B 1/0483* (2013.01)

(58) Field of Classification Search
CPC ... H04B 1/40; H04B 1/0483; H04W 72/0453; H04W 52/346
USPC .......................................................... 455/307
See application file for complete search history.

(56) References Cited

U.S. PATENT DOCUMENTS

| | | | | |
|---|---|---|---|---|
| 2006/0067254 A1* | 3/2006 | Mahbub | ............... | H03H 9/0576 370/282 |
| 2010/0091752 A1* | 4/2010 | Kemmochi | ............... | H03H 7/09 370/339 |
| 2012/0083216 A1* | 4/2012 | Kenington | ........... | H04B 1/0057 455/63.1 |
| 2014/0133364 A1* | 5/2014 | Weissman | ............ | H04B 1/0057 370/273 |
| 2017/0054485 A1* | 2/2017 | Hwang | .................. | H04B 7/068 |

* cited by examiner

*Primary Examiner* — Lee Nguyen
(74) *Attorney, Agent, or Firm* — LRK Patent Law Firm

(57) ABSTRACT

A filter module includes an antenna, at least one filter configured to transmit a signal corresponding to a frequency of a predetermined band, and at least one amplification module connected to the filter and configured to amplify a signal. The filter includes a triplexer.

12 Claims, 3 Drawing Sheets

FILTER MODULE AND ELECTRONIC DEVICE USING THE SAME

CROSS REFERENCE TO RELATED APPLICATION

The present application claims the benefit of Korean Patent Application No. 10-2015-0126487, filed in the Korean Intellectual Property Office on Sep. 7, 2015, the entire contents of which are incorporated herein by reference.

BACKGROUND OF THE INVENTION

1. Technical Field

The present invention relates to a filter module including an antenna, at least one filter configured to transmit a signal corresponding to a frequency of a predetermined band, and at least one amplification module connected to the filter and configured to amplify the signal, wherein the filter includes a triplexer.

2. Description of Related Art

Smart terminals become explosively popular worldwide. In particular, since the year 2011, the use of Long Term Evolution (LIE), that is, a new mobile communication standard, and the number of countries in which LTE is used are suddenly increased. In LTE, a method for allocating various frequencies to communication companies and allowing each company to use a band, that is, a corresponding frequency band, is used. For example, a frequency of 1920~2170 MHz may be allocated to a band B1, a frequency of 1710~1880 MHz may be allocated to a band B3, a frequency of 824~894 MHz may be allocated to a band B5, a frequency of 2500~2690 MHz may be allocated to a band B7, and a frequency of 880~960 MHz may be allocated to a band B8.

Furthermore, a frequency may be divided into a low band, a middle band, and a high band depending on its size. For example, B12 (699~746 MHz) may be classified as a low band, B4 (1710~2155 MHz) and B2 (1850~1990 MHz) may be classified as a middle band, and B7 (2500~2690 MHz) may be classified as a high band. A proper filter or multiplexer may be used so that each frequency bandwidth passes through each band.

In particular, a communication method using a Carrier Aggregation (hereinafter referred to as a "CA") is recently used. The CA refers to a technology in which communication speed is improved using two or more frequency bands. In order to implement the technology, a transmission filter of two bands and a reception filter of two bands are used.

If a CA is applied, however, there is a problem in that three or more frequency bands cannot be support at the same time. Referring to FIGS. 1 and 2, FIG. 1 shows a CA support module used in Europe. A duplexer for the CA of a B1 band frequency and a B3 band frequency is used in the CA support module of FIG. 1. Furthermore, FIG. 2 shows a CA support module used in the United States. A duplexer for the CA of a B4 band frequency and a B25 band frequency is used in the CA support module of FIG. 2.

However, a conventional support module, such as those of FIGS. 1 and 2, is problematic in that a CA cannot be performed on the B1 band frequency, the B25 band frequency, and the B3 band frequency at once. A scheme for integrating corresponding semiconductor devices and reducing the size of the semiconductor devices while enabling the CA of a plurality of band frequencies at the same time is researched.

The present invention has been invented based on such a technical background and also has been invented to satisfy the aforementioned technical needs and to provide additional technical elements that may not be easily invented by those skilled in the art to which the present invention pertains.

SUMMARY OF THE INVENTION

An object of the present invention is to provide a filter module in which a filter includes a triplexer in order to efficiently use a CA as described above.

Technical objects to be achieved by the present invention are not limited to the object, and various technical objects may be included within a range evident to those skilled in the art from the following description.

A filter module according to an embodiment of the present invention includes an antenna, at least one filter configured to transmit a signal corresponding to a frequency of a predetermined band, at least one amplification module connected to the filter and configured to amplify a signal. The filter includes a triplexer.

Furthermore, in the filter module according to an embodiment of the present invention, the triplexer may include a first filter configured to transmit a signal of a first band frequency, a second filter configured to transmit a signal of a second band frequency, and a third filter configured to transmit a signal of a third band frequency.

In this case, in the filter module according to an embodiment of the present invention, the second filter may additionally transmit a signal of a fourth band frequency. Furthermore, the first band frequency may be B3, the second band frequency may be B and the third band frequency may be B25.

In this case, in the filter module according to an embodiment of the present invention, the second filter may additionally transmit a signal of a fourth band frequency, and the fourth band frequency may be B4. Furthermore, the band frequencies of the first filter and the second filter may not overlap.

Furthermore, the filter module according to an embodiment of the present invention may further include at least one output filter connected to an output terminal of the amplification module and configured to transmit a signal corresponding to a frequency of a predetermined band. In this case the amplification module may be connected between the output terminals of filters having output terminals bound into one and an input terminal of the output filter, and the output filter may include a duplexer.

Furthermore, in the filter module according to an embodiment of the present invention, the triplexer may bind the output terminals of filters which belong to the three filters of the triplexer and do not have overlapping band frequencies into one.

Furthermore, in the filter module according to an embodiment of the present invention, the triplexer may separate the output terminals of filters which belong to the three filters of the triplexer and which have overlapping band frequencies. In this case, the triplexer transmits a middle band frequency band.

Furthermore, the filter module according to an embodiment of the present invention may further include a first switch connected between the antenna and the filter and configured to select a signal path. Furthermore, the filter module according to an embodiment of the present invention may further include a second switch connected between the filter and the amplification module and configured to select a signal path.

Furthermore, in the filter module according to an embodiment of the present invention, the amplification module may be a low noise amplifier. Furthermore, the filter may be a SAW filter.

According to an embodiment of the present invention, there is provided an electronic device using a filter module, including an antenna, at least one filter configured to transmit a signal corresponding to a frequency of a predetermined band, at least one amplification module connected to the filter and configured to amplify a signal. The filter includes a triplexer.

DETAILED DESCRIPTION

Hereinafter, embodiments of the present invention are described in detail with reference to the accompanying drawings. Embodiments to be described are provided in order for those skilled in the art to easily understand the technical spirit of the present invention, and the present invention is not restricted by the embodiments. Furthermore, contents represented in the accompanying drawings have been diagrammed in order to easily describe the embodiments of the present invention, and the contents may be different from drawing forms that are actually implemented.

Elements to be described herein are only examples for implementing the embodiments of the present invention. Accordingly, in other implementations of the present invention, different elements may be used without departing from the spirit and scope of the present invention.

Furthermore, an expression that some elements are "included" is an expression of an "open type", and the expression simply denotes that the corresponding elements are present, but should not be construed as excluding additional elements.

Furthermore, expressions, such as "the first" and "the second", are expressions used to only distinguish a plurality of elements from one another, and do not limit the sequence of the elements or other characteristics.

Furthermore, "power" according to an embodiment of the present invention may include all types of electrical energy which may be used in a common electrical circuit, such as a "voltage", "electric power", and "current."

Figure 1:
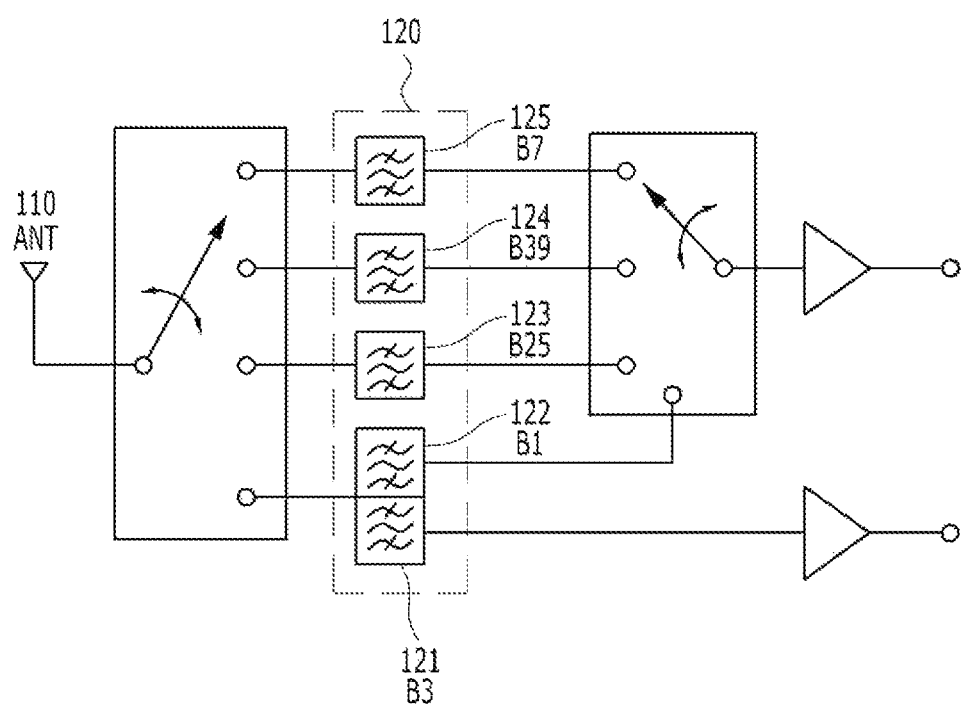
FIG. 1 shows the configuration of a conventional filter module.
Figure 2:
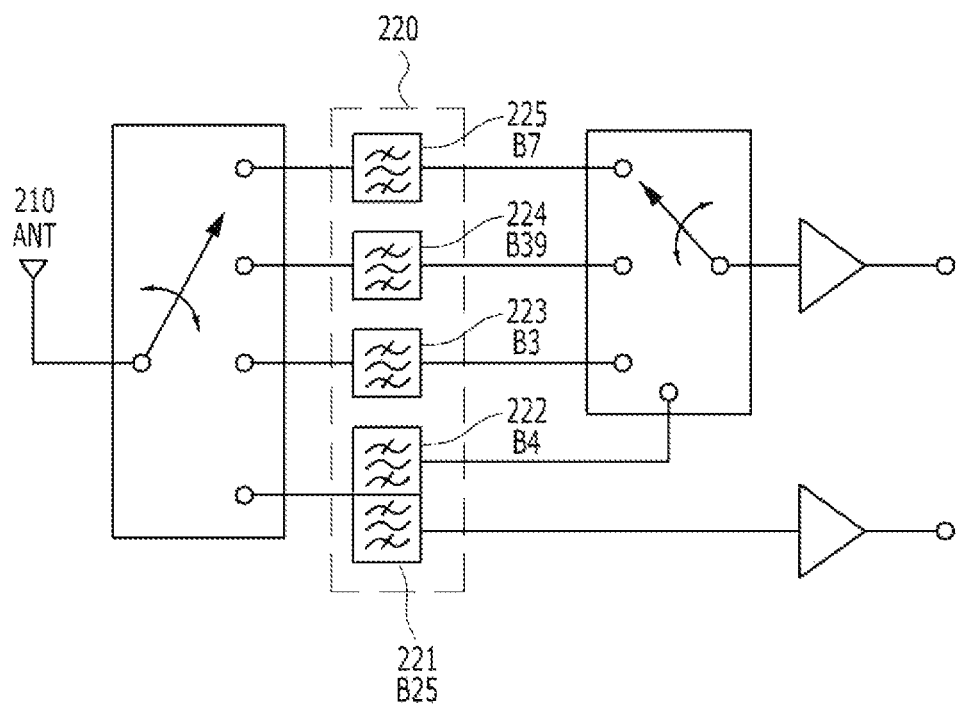
FIG. 2 shows the configuration of a conventional filter module.

FIGS. 1 and 2 show the configuration of a conventional filter module.

Referring to FIGS. 1 and 2, the conventional filter module includes at least one filter 120, 220 for receiving a signal from an antenna 110, 210 and transmitting a plurality of predetermined band frequencies. FIG. 1 is the filter module which may be used in Europe. The filter module of FIG. 1 includes a plurality of filters 123, 124, and 125 and duplexers 121 and 122 for the CA of a B1 band frequency and a B3 band frequency. Furthermore, FIG. 2 is the filter module which may be used in the United States. The filter module of FIG. 2 includes a plurality of filters 223, 224, and 225 and duplexers 221 and 222 for the CA of a B4 band frequency and a B25 band frequency.

However, the European filter module of FIG. 1 supports only the case of the bands 1+3, and the U.S.A filter module of FIG. 2 supports only the case of the bands 2+4. Accordingly, in a high-end model, all of a plurality of filter modules has to be used to support several bands because there is no filter module supporting the bands 1+2+3. Accordingly, research has been carried out on a scheme for integrating corresponding semiconductor devices and reducing the size of the semiconductor devices while enabling a CA for a plurality of band frequencies at the same time because a space occupied in a smart terminal has been unnecessarily increased to cover all of frequency bands being used worldwide.

Furthermore, frequency band information defined in 3GPP Release H is listed in Table 1. Referring to Table 1, in the E-UTRA Operating Band column, 1 is a term used in this specification and corresponds to B1. The remaining bands are marked in the same manner.

TABLE 1

| E-UTRA Operating Band | Uplink (UL) operating band BS receive UE transmit $F_{UL\_low}$-$F_{UL\_high}$ | Downlink (DL) operating band BS transmit UE receive $F_{DL\_low}$-$F_{DL\_high}$ | Duplex Mode |
|---|---|---|---|
| 1 | 1920 MHz-1980 MHz | 2110 MHz-2170 MHz | FDD |
| 2 | 1850 MHz-1910 MHz | 1930 MHz-1990 MHz | FDD |
| 3 | 1710 MHz-1785 MHz | 1805 MHz-1880 MHz | FDD |
| 4 | 1710 MHz-1755 MHz | 2110 MHz-2155 MHz | FDD |
| 5 | 824 MHz-849 MHz | 969 MHz-894 MHz | FDD |
| 6 (NOTE 1) | 830 MHz-840 MHz | 875 MHz-885 MHz | FDD |
| 7 | 2500 MHz-2570 MHz | 2620 MHz-2690 MHz | FDD |
| 8 | 880 MHz-915 MHz | 925 MHz-960 MHz | FDD |
| 9 | 1749.9 MHz-1784.9 MHz | 1844.9 MHz-1879.9 MHz | FDD |
| 10 | 1710 MHz-1770 MHz | 2110 MHz-2170 MHz | FDD |
| 11 | 1427.9 MHz-1447.9 MHz | 1475.9 MHz-1495.9 MHz | FDD |
| 12 | 699 MHz-716 MHz | 729 MHz-746 MHz | FDD |
| 13 | 777 MHz-787 MHz | 746 MHz-756 MHz | FDD |
| 14 | 788 MHz-798 MHz | 758 MHz-768 MHz | FDD |
| 15 | Reserved | Reserved | FDD |
| 16 | Reserved | Reserved | FDD |
| 17 | 704 MHz-716 MHz | 734 MHz-746 MHZ | FDD |
| 18 | 815 MHz-830 MHz | 860 MHz-875 MHz | FDD |

TABLE 1-continued

| E-UTRA Operating Band | Uplink (UL) operating band BS receive UE transmit $F_{UL\_low}$-$F_{UL\_high}$ | Downlink (DL) operating band BS transmit UE receive $F_{DL\_low}$-$F_{DL\_high}$ | Duplex Mode |
|---|---|---|---|
| 19 | 830 MHz-845 MHz | 875 MHz-890 MHz | FDD |
| 20 | 832 MHz-862 MHz | 791 MHz-821 MHz | |
| 21 | 1447.9 MHz-1462.9 MHz | 1495.9 MHz-1510.9 MHz | FDD |
| 22 | 3410 MHz-3490 MHz | 3510 MHz-3590 MHz | FDD |
| 23 | 2000 MHz-2020 MHz | 2180 MHz-2200 MHz | FDD |
| 24 | 1626.5 MHz-1660.5 MHz | 1525 MHz-1559 MHz | FDD |
| 25 | 1850 MHz-1915 MHz | 1930 MHz-1995 MHz | FDD |
| 26 | 814 MHz-849 MHz | 859 MHz-894 MHz | FDD |
| 27 | 807 MHz-824 MHz | 852 MHz-869 MHz | FDD |
| 28 | 703 MHz-748 MHz | 756 MHz-803 MHz | FDD |
| 29 | N/A | 717 MHz-728 MHz | FDD (NOTE 2) |
| 30 | 2305 MHz-2315 MHz | 2350 MHz-2360 MHz | FDD |
| 31 | 452.5 MHz-457.5 MHz | 462.5 MHz-467.5 MHz | FDD |
| 32 | N/A | 1452 MHz-1486 MHz | FDD (NOTE 2) |
| 33 | 1900 MHz-1920 MHz | 1900 MHz-1920 MHz | TDD |
| 34 | 2010 MHz-2025 MHz | 2010 MHz-2025 MHz | TDD |
| 35 | 1850 MHz-1910 MHz | 1850 MHz-1910 MHz | TDD |
| 36 | 1930 MHz-1990 MHz | 1930 MHz-1990 MHz | TDD |
| 37 | 1910 MHz-1930 MHz | 1910 MHz-1930 MHz | TDD |
| 38 | 2570 MHz-2620 MHz | 2570 MHz-2620 MHz | TDD |
| 39 | 1880 MHz-1920 MHz | 1880 MHz-1920 MHz | TDD |
| 40 | 2300 MHz-2400 MHz | 2300 MHz-2400 MHz | TDD |
| 41 | 2496 MHz-2690 MHz | 2496 MHz-2690 MHz | TDD |
| 42 | 3400 MHz-3600 MHz | 3400 MHz-3600 MHz | TDD |
| 43 | 3600 MHz-3800 MHz | 3600 MHz-3800 MHz | TDD |
| 44 | 703 MHz-803 MHz | 703 MHz-803 MHz | TDD |

NOTE 1:
Band 6 is not applicable.
NOTE 2:
Restricted to E-UTRA operation when carrier aggregation is configured. The downlink operating band is paired with the uplink operating band (external) of the carrier aggregation configuration that is supporting the configured Pcell.

Figure 3:
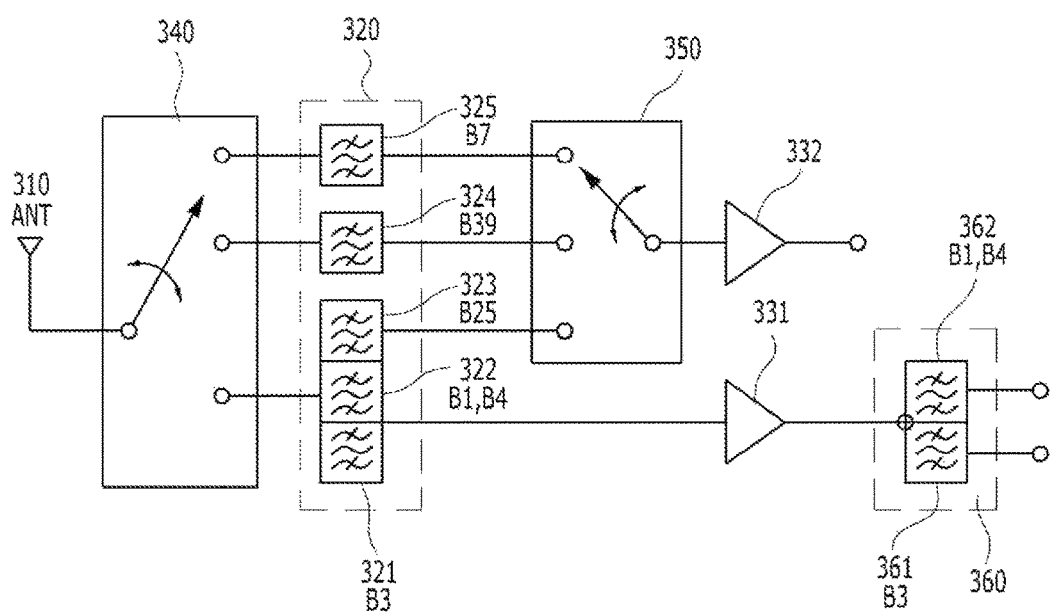
FIG. 3 shows a detailed configuration of a filter module according to an embodiment of the present invention.

FIG. 3 shows a detailed configuration of a filter module according to an embodiment of the present invention.

Referring to FIG. 3, the filter module according to an embodiment of the present invention may include an antenna 310, a filter 320, and amplification modules 331 and 332.

The antenna 310 functions to send or receive electromagnetic waves to or from the space for transmission/reception. The antenna may be used for signal reception or for signal transmission. Furthermore, the antenna may include a single antenna or may include a plurality of antennas for a high frequency and mid/low frequencies depending on the frequency band in order to distinguish several bands from one another.

The filter 320 transmits a signal corresponding to a frequency of a predetermined band with respect to each of a signal for reception (Rx) and a signal for transmission (Tx) received from the antenna. In this case, the filter may include at least one of a low band, a middle band, and a high band. A filter of several bands, such as a high band connected to a high band antenna and a middle/low band connected to a middle/low band antenna, may be connected to a single antenna and used. The bandwidth of such a filter may be properly set depending on a country and area in which a terminal including a semiconductor device may be used.

The several bands may include all of combinations capable of a CA. The combinations capable of a CA and some embodiments of support bandwidth according to the combinations are listed in Table 2 below.

TABLE 2

| Band Combination | Carrier Frequency G: GHz M: MHz | Max. aggregated BW[MHz] |
|---|---|---|
| B7 + B7 | 2.6 G + 2.6 G | 40 |
| B38 + B38 | 2.6 G + 2.6 G | 40 |
| B41 + B41 | 2.5 G + 2.5 G | 40 |
| B25 + B25 | 1.9 G + 1.9 G | 20 |
| B41 + B41 | 2.5 G + 2.5 G | 40 |
| B4 + B13 | 2.1 G + 700 M | 30 |
| B7 + B20 | 2.6 G + 800 M | 30 |
| B1 + B19 | 2.1 G + 800 M | 35 |
| B3 + B5 | 1.8 G + 800 M | 30 |
| B1 + B18 | 2.1 G + 800 M | 35 |
| B4 + B5 | 1.7 G + 800 M | 20 |
| B3 + B20 | 1.8 G + 800 M | 30 |
| B2 + B17 | 1.9 G + 700 M | 20 |
| B2 + B29 | 1.9 G + 700 M | 20 |
| B4 + B29 | 2.1 G + 700 M | 20 |
| B4 + B17 | 2.1 G + 700 M | 20 |
| B4 + B12 | 2.1 G + 700 M | 20 |
| B3 + B8 | 1.8 G + 900 M | 30 |
| B3 + B7 | 1.7 G + 2.6 G | 40 |
| B5 + B12 | 800 M + 700 M | 20 |
| B4 + B7 | 1.7 G + 2.6 G | 30 |
| B5 + B17 | 800 M + 700 M | 20 |
| B8 + B20 | 900 M + 800 M | 20 |
| B11 + B18 | 1.4 G + 800 M | 25 |
| B1 + B21 | 2.1 G + 1.4 G | 35 |

Furthermore, the filter may include a triplexer. The triplexer is a filter element for separating three frequency bands. The triplexer can distinguish and transmit the three band frequencies because three filters for transmitting the three band frequencies have been integrated into the triplexer. If such a triplexer is used, there is an advantage in that a cost can be reduced because the space of an electronic device including a filter module is reduced. Furthermore, the triplexer can transmit a middle band frequency band. The middle band frequency band is globally a common frequency band and thus may be used in various high-end terminals.

The triplexer includes a first filter 321 for transmitting a signal of a first band frequency, a second filter 322 for transmitting a signal of a second band frequency, and a third filter 323 for transmitting a signal of a third band frequency. In this case, the first band frequency is B3, the second band frequency is B1, and the third band frequency is B25. Furthermore, the band frequencies of the first filter and the second filter do not overlap.

Furthermore, the second filter may additionally transmit a fourth band frequency, and the fourth band frequency is B4. B4 and B1 may be used as the same filter because the bandwidth of B4 includes the bandwidth of B 1. Furthermore, the filter may be configured so that the fourth band frequency includes the second band frequency.

In the triplexer, the output terminals of filters that belong to the three filters of the triplexer and do not have overlapping band frequencies are bound into one. If the output terminals of filters having overlapping band frequencies are bound into one, crosstalk may be generated in the band frequencies. Accordingly, only the output terminals of filters not having overlapping band frequencies need to be bound into one. Furthermore, the output terminals of filters that belong to the three filters of the triplexer and have overlapping band frequencies are separated. For a reason described above, the output terminals of filters having overlapping band frequencies are separated in order to prevent crosstalk between the band frequencies.

Furthermore, the filter module according to an embodiment of the present invention may further include at least one output filter connected to the output terminal of the amplification module and configured to transmit a signal corresponding to a frequency of a predetermined band. In this case, the amplification module is connected between the output terminals of filters having their output terminals bound into one and the input terminal of the output filter. Furthermore, the output filter includes a duplexer.

For example, if signals having B1+B3 bands are subject to a CA, the aggregated signal is transmitted to the single bound output terminal through the first filter 321 and the second filter 322. The outputs of the bandwidths of B1 and B3 may be connected to one because transmission/reception bandwidths do not overlap in the bandwidths of B1 and B3. The frequency of the bound signal passing through the amplification module is separated into frequencies corresponding to B1(B4) and B3 through the output filter. In this case, the output filter may be implemented using a duplexer, thereby being capable of integrating and reducing spaces including corresponding semiconductor devices.

Furthermore, a Surface Acoustic Wave (SAW) filter or a notch filter may be used as the filter according to an embodiment of the present invention. The notch filter has a characteristic in that it is difficult for the notch filter to transmit a specific frequency band and that the notch filter of a Band Reject Filter (BRF) does not transmit a portion having a very narrow area.

SAW is an acoustic wave propagated along a surface of an elastic substrate. An acoustic wave is generated from an electrical signal as a result of a piezoelectric effect. In this case, the electric field of the acoustic wave is concentrated near the surface of the substrate and may interact with the conductive electrons of another semiconductor placed on the surface. A medium for minimizing an energy loss within a system may be selected by physically separating the substrate along which the acoustic wave is propagated and the semiconductor. The SAW filter is obtained by replacing an electronic circuit with an electromechanical element using the interaction between SAW having such a characteristic and the conductive electrons of the semiconductor. The SAW filter is applied as an RF or IF filter chip for providing frequency selectivity. The SAW filter may function to transmit a required frequency and to remove an unnecessary frequency.

Furthermore, the amplification module of the filter according to an embodiment of the present invention amplifies a transmitted/received signal. In this case, the amplifier of the amplification module may include a Low Noise Amplifier (LNA). The LNA refers to a high frequency amplifier configured to lower a noise index of the entire receiver, and is used to receive and propagate an input voltage, such as a communication line of a visible distance having a large propagation loss.

Furthermore, the filter module according to an embodiment of the present invention may further include a first switch 340 connected between the antenna 310 and the filter 320 and configured to select a signal path and a second switch 350 connected between the filter 320 and the amplification module and configured to select a signal path.

An electronic device using the filter module according to an embodiment of the present invention includes the antenna, the at least one filter configured to transmit a signal corresponding to a frequency of a predetermined band, and the at least one amplification module connected to the filter and configured to amplify a signal. In this case, the filter includes the triplexer.

The filter module according to an embodiment of the present invention can efficiently use a CA because the filter includes the triplexer.

Furthermore, the filter module according to an embodiment of the present invention implements several filters using a single triplexer. Accordingly, corresponding semiconductor devices can be integrated and can be reduced in size because unnecessary filters are removed.

Furthermore, the filter module according to an embodiment of the present invention has advantages in that the space of an electronic device including the filter module can be reduced because the triplexer is used and thus a cost can be reduced.

Furthermore, in the filter module according to an embodiment of the present invention, the output terminals of the triplexer are bounded, and the number of amplification modules connected to the respective output terminals can be reduced. Accordingly, the CA of two band frequencies bounded to the output terminals can be facilitated, the number of amplification modules can be minimized, and thus corresponding semiconductor devices can be integrated and reduced in size.

Furthermore, the filter module according to an embodiment of the present invention is compatible with a smart terminal in any country because it is connected to a middle band frequency band that is commonly used worldwide.

The aforementioned embodiments of the present invention have been disclosed for illustrative purposes, but the present invention is not restricted by the embodiments. Furthermore, those skilled in the art to which the present invention pertains may modify and change the present invention in various ways within the spirit and scope of the present invention, and such modifications and changes should be construed as falling within the scope of the present invention.

What is claimed is:

1. A filter module comprising:
an antenna;
at least one filter configured to transmit a signal corresponding to a frequency of a predetermined band; and
at least one amplification module connected to the filter and configured to amplify a signal,
wherein the filter comprises a triplexer,
wherein the triplexer comprises:
a first filter configured to transmit a signal of a first band frequency;
a second filter configured to transmit a signal of a second band frequency; and
a third filter configured to transmit a signal of a third band frequency,
wherein the second filter additionally transmits a signal of a fourth band frequency, where a bandwidth of the second band frequency includes a bandwidth of the fourth band frequency,
wherein a first switch is connected between the antenna and the filter and configured to select a signal path between the antenna and the filter, and
wherein a second switch is connected between the filter and the amplification module and configured to select a signal path of one of the first to third filters.

2. The filter module of claim 1, wherein:
the first band frequency is B3,
the second band frequency is B1, and
the third band frequency is B25.

3. The filter module of claim 1, wherein band frequencies, of the first filter and the second filter do not overlap.

4. The filter module of claim 1, wherein the triplexes' binds output terminals of filters, which do not have overlapping band frequencies among the three filters, into one.

5. The filter module of claim 1, further comprising at least one output filter connected to an output terminal of the amplification module and configured to transmit a signal corresponding to a frequency of a predetermined band.

6. The filter module of claim 5, wherein the amplification module is connected between an input terminal of the output filter and the output terminals of the filters, which are bound into one.

7. The filter module of claim 5, wherein the output filter comprises a duplexer.

8. The filter module of claim 1, wherein the triplexer separates output terminals of filters which have overlapping band frequencies among the three filters.

9. The filter module of claim 1, wherein the triplexer transmits a middle band frequency band.

10. The filter module of claim 1, wherein the amplification module comprises a low noise amplifier.

11. The filter module of claim 1, wherein the filter comprises a SAW filter.

12. An electronic device using a filter module, the filter module comprising:
an antenna;
at least one filter configured to transmit a signal corresponding to a frequency of a predetermined band; and
at least one amplification module connected to the filter and configured to amplify a signal,
wherein the filter comprises a triplexer,
wherein the triplexer comprises:
a first filter configured to transmit a signal of a first band frequency;
a second filter configured to transmit a signal of a second band frequency; and
a third filter configured to transmit a signal of a third band frequency,
wherein the second filter additionally transmits a signal of a fourth band frequency, where a bandwidth of the second band frequency includes a bandwidth of the fourth band frequency,
wherein a first switch is connected between the antenna and the filter and configured to select a signal path between the antenna and the filter, and
wherein a second switch is connected between the filter and the amplification module and configured to select a signal path of one of the first to third filters.

* * * * *